United States Patent
Ishihara et al.

(10) Patent No.: US 9,987,813 B2
(45) Date of Patent: Jun. 5, 2018

(54) APPARATUS FOR MOUNTING TREAD RING ON TIRE BASE AND METHOD FOR MANUFACTURING RETREADED TIRE

(71) Applicant: SUMITOMO RUBBER INDUSTRIES, LTD., Kobe-shi, Hyogo (JP)

(72) Inventors: Noboru Ishihara, Kobe (JP); Hiroyuki Onimatsu, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 613 days.

(21) Appl. No.: 14/403,960

(22) PCT Filed: Apr. 16, 2013

(86) PCT No.: PCT/JP2013/061276
§ 371 (c)(1),
(2) Date: Nov. 25, 2014

(87) PCT Pub. No.: WO2013/179792
PCT Pub. Date: Dec. 5, 2013

(65) Prior Publication Data
US 2015/0151503 A1 Jun. 4, 2015

(30) Foreign Application Priority Data
May 31, 2012 (JP) .................................. 2012-124986

(51) Int. Cl.
*B29D 30/56* (2006.01)
*B29D 30/52* (2006.01)
(Continued)

(52) U.S. Cl.
CPC ........ *B29D 30/56* (2013.01); *B29D 2030/523* (2013.01); *B29D 2030/549* (2013.01); *B29D 2030/585* (2013.01); *Y10T 156/17* (2015.01)

(58) Field of Classification Search
CPC .... B29D 30/2607; B29D 30/54; B29D 30/56; B29D 2030/523; B29D 2030/585
See application file for complete search history.

(56) References Cited

U.S. PATENT DOCUMENTS 2,878,857 A * 3/1959 Smith ................ B29D 30/3014
156/406.2
3,976,532 A 8/1976 Barefoot
(Continued)

FOREIGN PATENT DOCUMENTS

EP 0108723 A1 * 5/1984
EP 1 260 351 A2 11/2002
(Continued)

OTHER PUBLICATIONS

Extended European Search Report, dated Nov. 11, 2015, for European Application No. 13797658.5.
(Continued)

*Primary Examiner* — Geoffrey L Knable
(74) *Attorney, Agent, or Firm* — Birch, Stewart, Kolasch & Birch, LLP

(57) ABSTRACT

An apparatus 1 for mounting an annular tread ring R on an outer peripheral surface TS of a tire base T, which includes a tire base holding section 2 which is movable between a first position P1 and a second position P2 while holding the tire base T, and a tread ring mounting section 3 for mounting the tread ring R on the outer peripheral surface TS of the tire base T. The tread ring mounting section 3 comprises a tread holder 10 for holding the inner circumferential surface of the tread ring R, and a tread pushing-out device 11 for pushing out the tread ring R in the axis direction. At the second
(Continued)

position P2, after placing the tread ring R on the outer peripheral surface TS of the tire base T in the tire base holding section 2, the tread ring mounting section 3 pushes out the tread ring R from the tread holder 10 toward the first position P1 by the tread pushing-out device 11. And the tire base holding section 2 moves toward the first position P1 at the same speed as the pushing-out speed of the tread pushing-out device 11. Thereby, the tread ring R is mounted on the outer peripheral surface TS of the tire base T.

4 Claims, 8 Drawing Sheets

(51) Int. Cl.
 *B29D 30/54* (2006.01)
 *B29D 30/58* (2006.01)

(56) References Cited

U.S. PATENT DOCUMENTS

| | | | |
|---|---|---|---|
| 5,066,448 A | * | 11/1991 | Chlebina ............... B29C 33/442 249/68 |
| 5,427,636 A | | 6/1995 | Chabin et al. |
| 2002/0170652 A1 | | 11/2002 | Parrish et al. |
| 2012/0318458 A1 | | 12/2012 | Araki |

FOREIGN PATENT DOCUMENTS

| | | |
|---|---|---|
| EP | 2 527 132 A1 | 11/2012 |
| JP | 50-158676 B2 | 12/1975 |
| JP | 6-508570 A | 9/1994 |
| JP | 9-70903 A | 3/1997 |
| JP | 2011-143688 A | 7/2011 |
| JP | 2012-963 A | 1/2012 |

OTHER PUBLICATIONS

International Search Report issued in PCT/JP2013/061276, dated Jul. 16, 2013.

\* cited by examiner

FIG.6
(A)
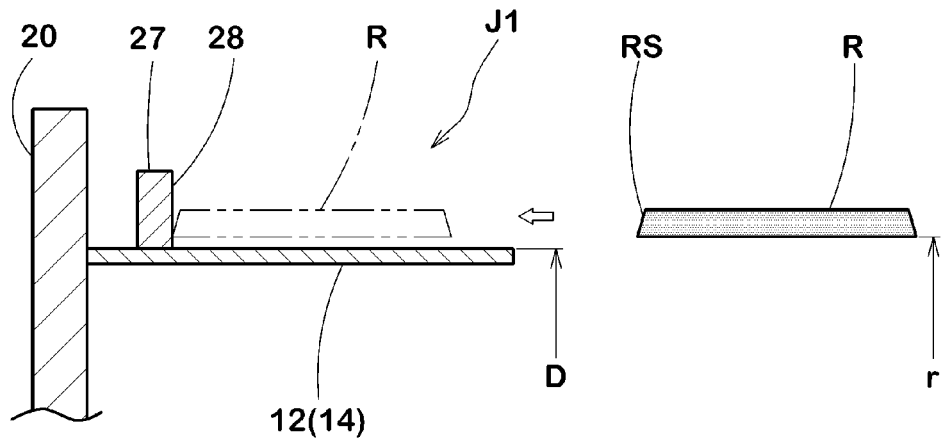
(B)
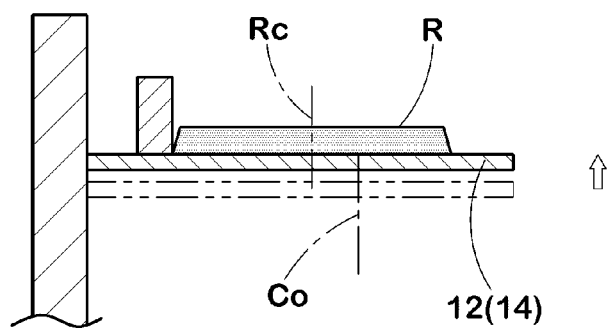
(C)
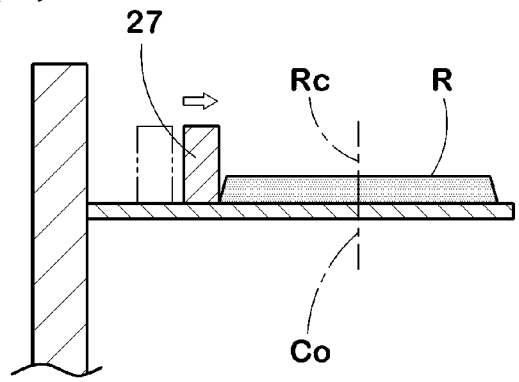

APPARATUS FOR MOUNTING TREAD RING ON TIRE BASE AND METHOD FOR MANUFACTURING RETREADED TIRE

TECHNICAL FIELD

The present invention relates to an apparatus for mounting a tread ring on a tire base and a method for manufacturing a retreaded tire, by which an annular tread ring made of vulcanized rubber can be mounted on the outer peripheral surface of the tire base with high accuracy.

BACKGROUND ART

In FIG. 8, shown is an example of a precure type tire retreading method. In this method, a tire base (a) is prepared by removing the tread rubber from a spent tire.
The tire base (a) has a tread forming face a1 from which the tread rubber has been removed and which is buffed.
To the tread forming face a1, an unvulcanized rubber seat b for adhesive purpose is applied.
On the outside of the unvulcanized rubber seat b, a strip-shaped vulcanized tread rubber c is wound.
The tire base (a) around which the tread rubber c has been wound is subjected to a heating treatment.
Thereby, the tire base (a) and the tread rubber c are united (see Patent document 1 for example).
The heating treatment is carried out in a container d for heating treatment, e.g. vulcanizer or the like.

If a strip-shaped vulcanized tread rubber c is used, on the occasion of connecting both ends of the tread rubber c in its longitudinal direction, there is a possibility that the tread pattern becomes discontinuous in the tire circumferential direction. In this instance, the exterior appearance of the tire is deteriorated.

In order to solve the above-mentioned discrepancy, it is desirous that a tread ring or a tread rubber annularly vulcanization-shaped in advance is mounted on the outer peripheral surface of the tire base. In such a case, however, the need arises for a new apparatus for mounting an annular tread ring on the outer peripheral surface of a tire base with high accuracy.

PRIOR ART DOCUMENT

Patent Document

Patent document 1: Japanese Patent Application Publication No. H09-70903

SUMMARY OF THE INVENTION

Problems to be Solved by the Invention

The present invention is intended to provide an apparatus for mounting a vulcanized tread ring on an outer peripheral surface of a tire base with high accuracy, and to provide a method for manufacturing a retreaded tire.

Means of Solving the Problems

A first invention in the present invention is an apparatus for mounting an annular tread ring made of vulcanized rubber on an outer peripheral surface of a tire base, which is characterized by comprising a tire base holding section for holding the tire base which is movable in an axis direction of the tire base between a first position and a second position, and
a tread ring mounting section for mounting the tread ring on the outer peripheral surface of the tire base which is disposed on the second position side of the tire base holding section, the tread ring mounting section comprising a tread holder for holding the inner circumferential surface of the tread ring, and a tread pushing-out device for pushing out the tread ring held by the tread holder in the axis direction,
wherein at the second position, after placing the tread ring on the outer peripheral surface of the tire base in the tire base holding section, the tread ring mounting section pushes out the tread ring from the tread holder toward the first position by the tread pushing-out device, and
at the same speed as the pushed-out tread ring, the tire base holding section moves toward the first position, whereby the tread ring is mounted on the outer peripheral surface of the tire base.

In the first invention, preferably, the tread holder comprises a plurality of paddle plates arranged on a circle concentric with the tire base and having holding surfaces for holding the inner circumferential surface of the tread ring.

In the first invention, preferably, the tread holder comprises a diameter increasing/decreasing device for moving the respective paddle plates radially outwardly or inwardly to increase or decrease the diameter of the holding surfaces.

In the first invention, preferably, the diameter increasing/decreasing device comprises an electrical motor, a central first gear wheel held concentrically with the tire base and driven by the electrical motor, a plurality of second gear wheels arranged around the first gear wheel and engaged with the first gear wheel, radially extending ball screw axes coupled with the second gear wheels through couplers, and radially-movable carriages having threaded holes screwed with the ball screw axes and movable radially inwardly or outwardly by rotating the ball screw axes, and
the paddle plates are attached to the respective radially-movable carriages.

In the first invention, preferably, the tread pushing-out device comprises
push-out plates being movable in the axis direction on the outer surfaces of the respective paddle plates and having abutting surfaces capable of abutting a side face of the tread ring on the second position side, and
a pusher moving means for pushing out the respective push-out plates toward the first position.

In the first invention, preferably, the tread pushing-out device comprises
push-out plates being movable in the axis direction on the outer surfaces of the respective paddle plates and having abutting surfaces capable of abutting a side face of the tread ring on the second position side, and
a pusher moving means for pushing out the respective push-out plates toward the first position,
the pusher moving means comprises
ball screw axes extending in the axis direction, rotatably supported by the radially-movable carriages and driven by the electrical motor,
threaded holes formed in the push-out plates and screwed with the ball screw axes, whereby the push-out plates are moved in the axis direction by rotating the ball screw axes.

A second invention in the present invention is a method for manufacturing a retreaded tire characterized by comprising a fitting process for fitting an annular tread ring made of vulcanized rubber on an outer peripheral surface of a tire base by the use of the apparatus as set forth in either one of the above descriptions.

Effects of the Invention

The tread pushing-out device in the present invention pushes out the tread ring on the tread holder toward the first position at the second position.
On this occasion, the tire base holding section moves toward the first position at the same speed as the tread ring, synchronizing with the tread pushing-out device.
Thereby, the tread ring is mounted on the outer peripheral surface of the tire base.
Accordingly, the apparatus according to the present invention can mount the tread ring on the outer peripheral surface of the tire base with high accuracy while maintaining a relative position between the tread ring and the tire base before moved.

MODE FOR CARRYING OUT THE INVENTION

Figure 1:
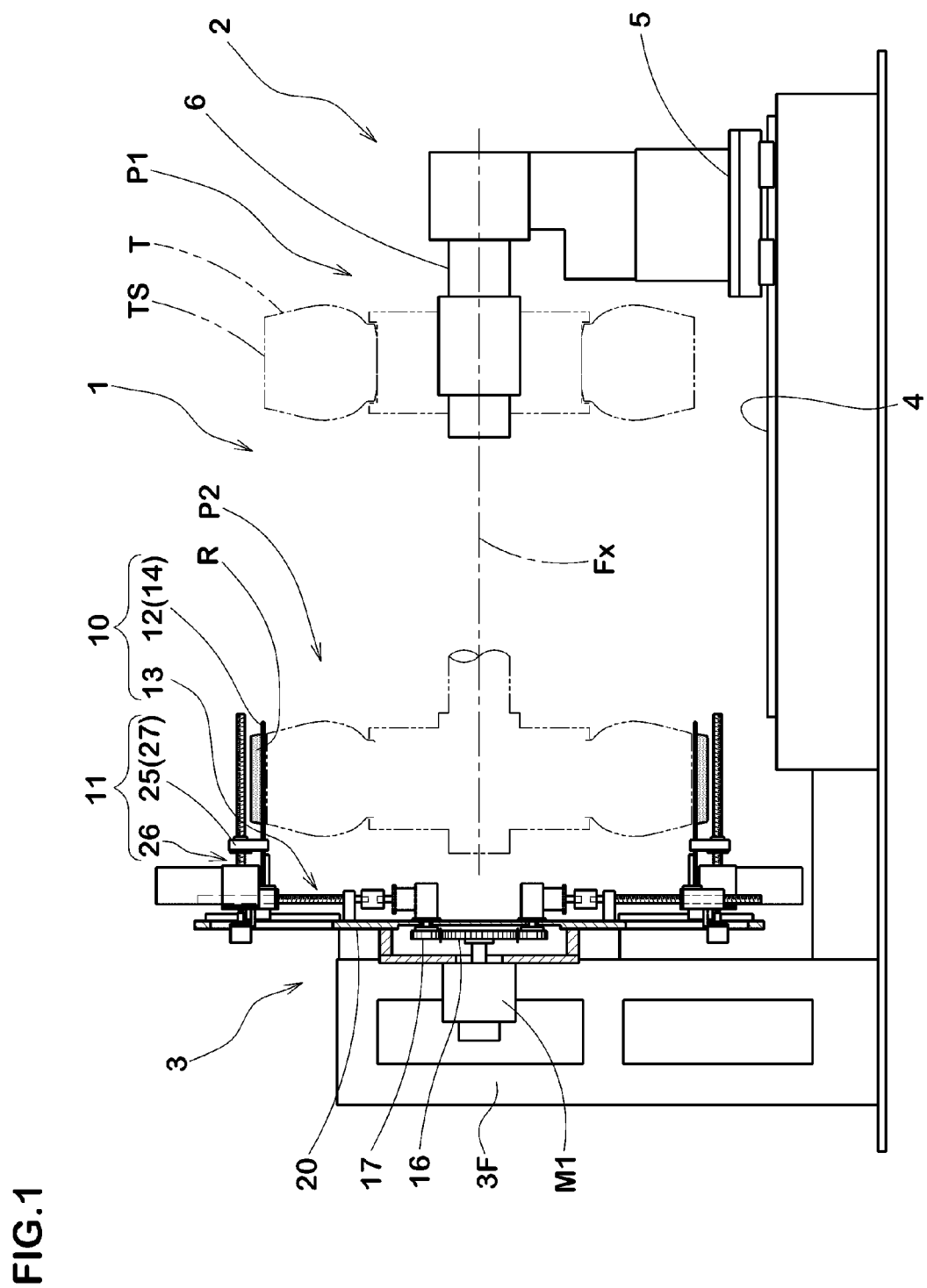
FIG. 1 A front elevational view showing an embodiment of the apparatus according to the present invention
FIG. 2 A side elevational view of FIG. 1
FIG. 3 A perspective view showing an example of the tread holder
FIG. 4 A cross sectional view showing a part of the tread ring mounting section
FIG. 5 An exploded perspective view showing a part of the tread ring mounting section
FIGS. 6 (A), (B) and (C) are schematic diagrams for explaining a method for manufacturing a retreaded tire
FIGS. 7 (A) and (B) are schematic diagrams for explaining a method for manufacturing a retreaded tire
FIG. 8 A schematic diagram for explaining a conventional tire retreading method
Figure 2:
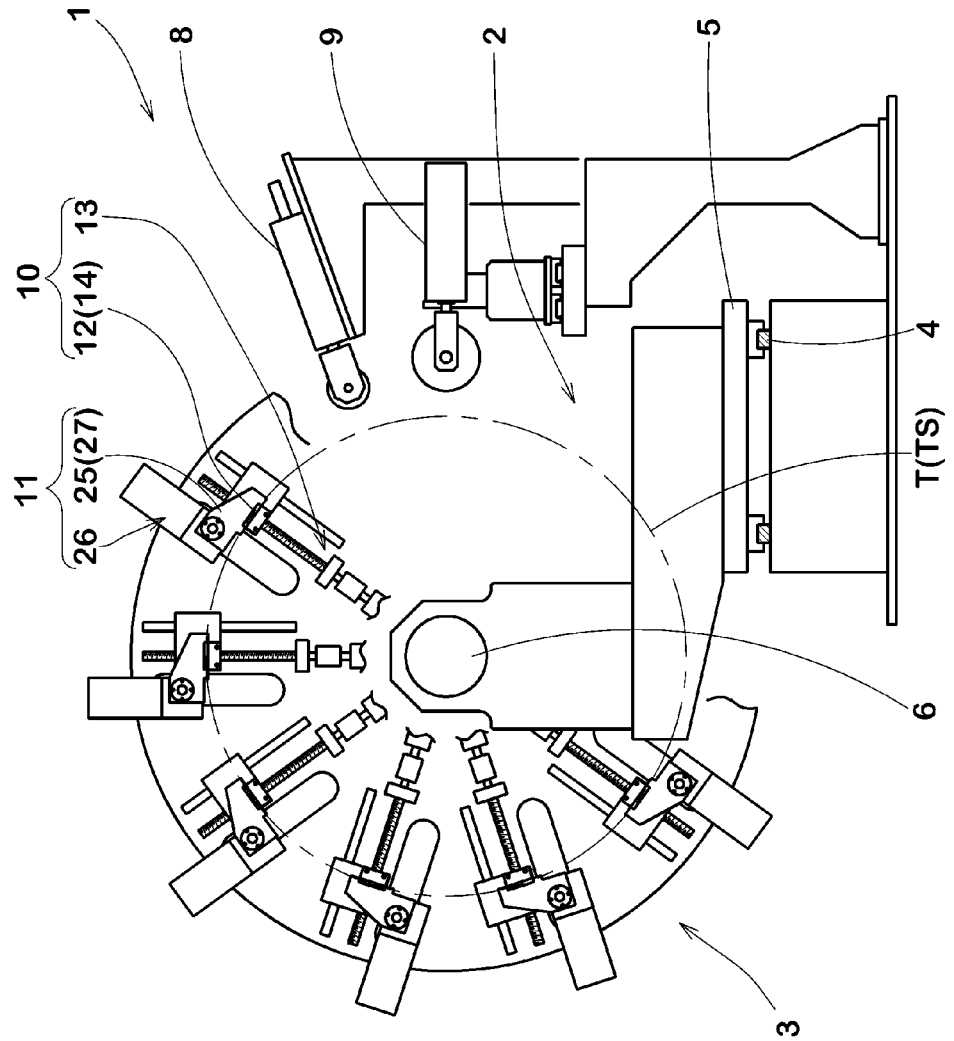
Figure 3:
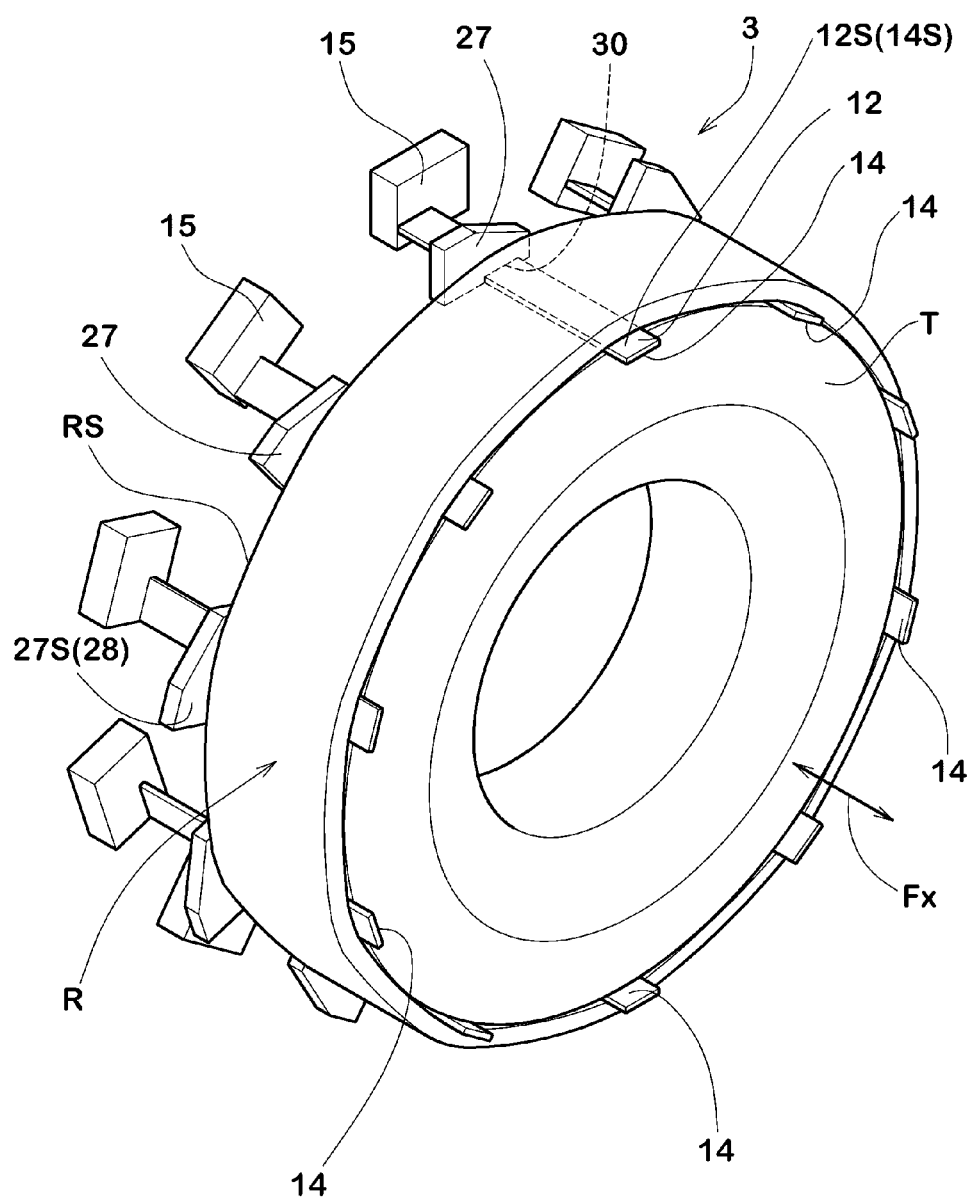
Figure 4:
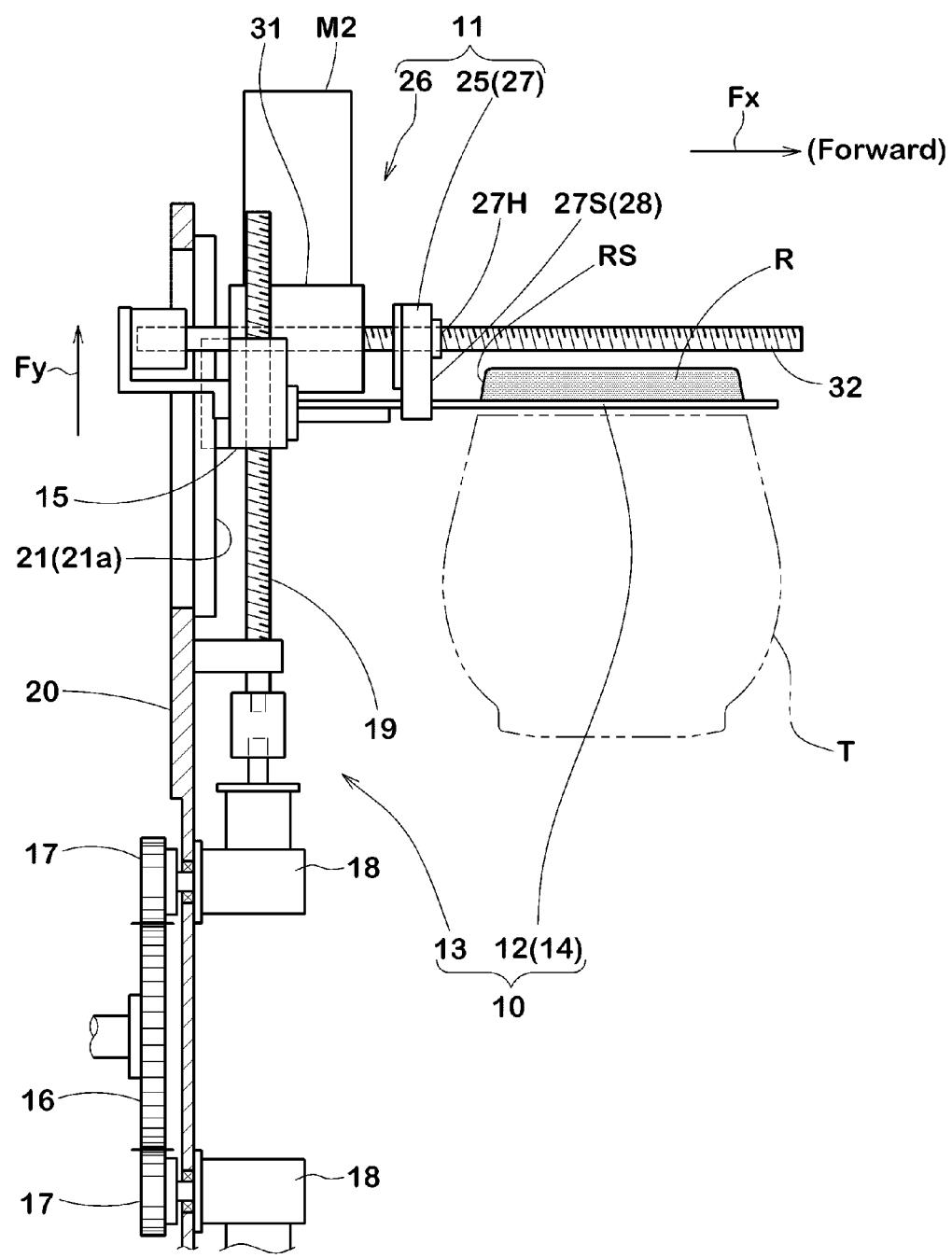
Figure 5:
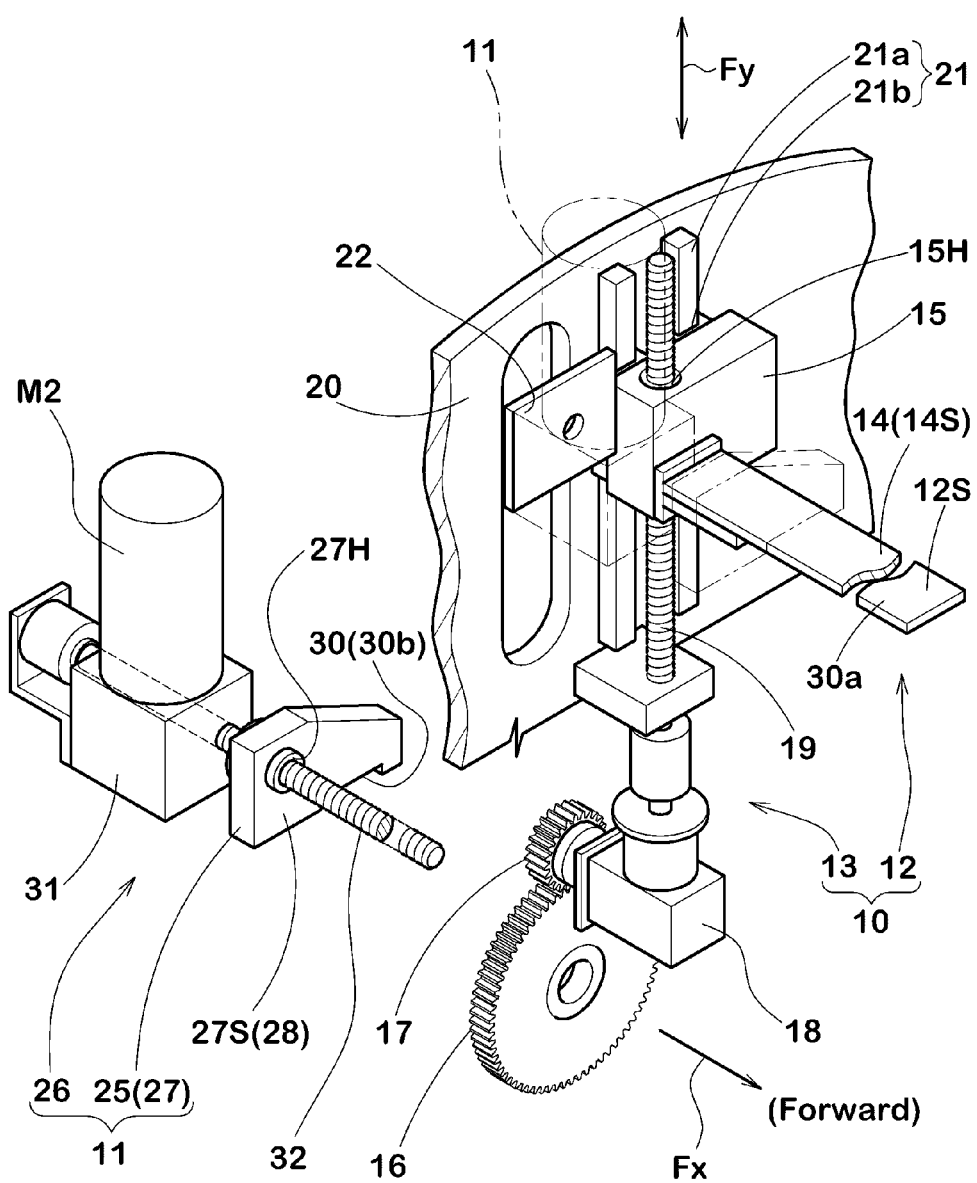

An embodiment of the present invention is described in detail according to the drawings.
As shown in FIG. 1 and FIG. 2, the apparatus 1 in this embodiment is for mounting a vulcanized annular tread ring R on an outer peripheral surface TS of a tire base T.
The apparatus 1 comprises a tire base holding section 2 and a tread ring mounting section 3.
The tire base holding section 2 is able to hold the tire base T. The tire base T is held such that the axis direction Fx of the tire becomes horizontal.
The tire base holding section 2 is movable in the axis direction between a first position P1 on the right and a second position P2 on the left in FIG. 1.
The tire base holding section 2 in this embodiment is provided with a movable carriage 5 movable on a rail 4 disposed along the axis direction Fx, and a support shaft 6 supported by a main portion provided on the movable carriage 5.
The tire base T which is mounted on a wheel rim, is held by the support shaft 6 detachably and attachably.
In this embodiment, performed at the first position P1 are, for example,
fitting of the tire base T on the support shaft 6, applying of an unvulcanized rubber seat for adhesive purpose to the buffed tread forming face of the tire base T,
stitching in which the tire base T and the tread ring R are pressure bonded to obtain a raw retreaded tire, and taking-out of the raw retreaded tire.
In FIG. 2, shown are an applying apparatus 8 for applying the unvulcanized rubber seat for adhesive purpose to the tire base T, and a stitcher 9 for pressure bonding the tire base T and the tread ring R.
The tread ring mounting section 3 is disposed on the second position P2 side of the tire base holding section 2. The tread ring mounting section 3 is able to mount the tread ring R on an outer peripheral surface TS of the tire base T to which the unvulcanized rubber seat is applied in advance. The tread ring mounting section 3 has a tread holder 10 for holding the tread ring R, and a tread pushing-out device 11 for pushing out the held tread ring R in the axis direction toward the first position P1.
The tread holder 10 comprises a supporter 12 and a diameter increasing/decreasing device 13.
As shown in FIG. 3, the supporter 12 is, for example, composed of a plurality of (ten, in this example) paddle plates 14 arranged on a circle concentric with the tire base T. The radially outer surfaces 14S of the respective paddle plates 14 constitute a holding surface 12S for holding the inner circumferential surface of the tread ring R.
The paddle plate 14 is in the form of a plate extending longer in the axis direction Fx and its one end is supported by a radially-movable carriage 15.
The diameter increasing/decreasing device 13 is to move the paddle plates 14 radially outwardly or inwardly so that the diameter of the holding surface 12S is increased or decreased.
As shown in FIG. 4 and FIG. 5, the diameter increasing/decreasing device 13 in this embodiment is provided with an electrical motor M1 (shown in FIG. 1), a central first gear wheel 16 held concentrically with the tire base T and driven by the electrical motor M1,
a plurality of (ten, in this example) second gear wheels 17 arranged around the first gear wheel 16 and engaged with the first gear wheel 16,
ball screw axes 19 extending radially and coupled with the respective second gear wheels 17 through a coupler 18, and the radially-movable carriages 15 having threaded holes 15H screwed with the ball screw axes 19 and being movable radially outwardly or inwardly by rotating the ball screw axes 19.
As shown in FIG. 1, the electrical motor M1 is attached to a frame 3F of the tread ring mounting section 3, for example.
The first gear wheel 16 is fixed to the electrical motor M1. A disk-shaped side plate 20 is supported by the frame 3F, for example.
As shown in FIG. 4 and FIG. 5, the side plate 20 is provided with the second gear wheels 17 and the ball screw axes 19. The central axis of the second gear wheel 17 and the ball screw axis 19 are orthogonal.
The coupler 18 comprises an array of gears using for example bevel gears and the like and can transmit motive energy of the second gear wheels 17 to the ball screw axes 19.
The radially-movable carriage 15 in this embodiment is block-shaped and has a threaded hole 15H screwed with the ball screw axis 19.
Between the radially-movable carriage 15 and the side plate 20, a guiding part 21 is provided.
For example, the guiding part 21 comprises
a guide rail 21a provided on the side plate 20 and extending parallel with the ball screw axes 19, and a slider 21b fixed to the radially-movable carriage 15 and having a guide groove engaging with the guide rail 21a.

To each of the radially-movable carriages 15, one end in the axis direction of one paddle plate 14 is fixed.

In this embodiment, a side of the radially-movable carriage 15 is provided with a fitting plate part 22.

To the fitting plate part 22, the tread pushing-out device 11 is attached.

The tread pushing-out device 11 comprises a pusher 25 and a pusher moving means 26.

The pusher 25 is constructed by a plurality of push-out plates 27 movable in the axis direction on the outer surfaces 14S of the respective paddle plates 14.

Each of the push-out plates 27 has, in its side face 27S facing to the tire base holding section 2, an abutting surface 28 for abutting a side face RS of the tread ring R.

Between the push-out plate 27 and the paddle plate 14, a guiding part 30 for guiding the push-out plate 27 in the axis direction Fx is formed.

For example, the guiding part 30 is constructed by a guide surface 30a including the outer surface 14S and both side surfaces of the paddle plate 14, and a guide concave portion 30b for engaging the guide surface 30a which is provided on the push-out plate 27.

The pusher moving means 26 can move the respective push-out plates 27 in the axis direction.

By the movement of the push-out plates 27 toward the tire base holding section 2, the tread ring R on the supporter 12 is pushed out from the supporter 12 toward the first position P1.

The pusher moving means 26 in this embodiment comprises an electrical motor M2, and a ball screw axis 32 rotationally driven by the electrical motor M2.

The electrical motor M2 is provided on the fitting plate part 22 of the radially-movable carriage 15.

The motive energy of the electrical motor M2 is transmitted to the ball screw axis 32 through a bearing box 31.

The push-out plate 27 is provided with a threaded hole 27H screwed with the ball screw axis 32.

Accordingly, by rotating the ball screw axis 32, the push-out plate 27 can move in the axis direction.

In synchronism with motion of the tire base holding section 2 from the second position P2 toward the first position P1, the pusher moving means 26 move the respective push-out plates 27 toward the tire base holding section 2 at the same speed as the tire base holding section 2.

Thereby, it is possible to push out the tread ring R, at the same speed, onto the outer peripheral surface TS of the tire base T moving in the axis direction. Namely, the tread ring R is fitted on the outer peripheral surface TS of the tire base T while maintaining the relative position of the tread ring R and the tire base T at the second position P, therefore, the fitting of high accuracy can be achieved.

Next, a method for manufacturing a retreaded tire will be described.

The method for manufacturing a retreaded tire comprises a fitting process for fitting the tread ring R on the outer peripheral surface TS of the tire base T by the use of the above-mentioned apparatus 1. For other processes than the fitting process, conventional methods may be suitably employed. Therefore, only the fitting process will be described below.

In the fitting process, as shown conceptually in FIG. 6 (A), the supporter 12 (paddle plates 14) waiting in a decreased diameter state J1 is loaded with the tread ring R until the side face RS of the tread ring R abuts on the abutting surface 28 of the push-out plate 27.

The supporter 12 in the decreased diameter state J1 has an outside diameter D less than the inside diameter r of the tread ring R.

Thereby, the tread ring R can be accurately set on the supporter 12 neither twisted nor inclined.

Next, as shown conceptually in FIG. 6 (B), the diameter of the supporter 12 (paddle plates 14) is increased to give tension to the tread ring R.

Thereby, displacement between the tread ring R and the supporter 12 can be prevented.

Preferably, in this increased diameter state, as shown in FIG. 6(C), the push-out plates 27 move toward the tire base holding section 2 so that the position Rc of the widthwise center of the tread ring R coincides with a predetermined reference position Co for mounting.

The reference position Co is used to align the center of the tread ring R with the center of the tire base T.

Accordingly, at the second position P2, the reference position Co coincides with the position Tc of the widthwise center of the tire base 2.

Thereby, tread rings R of various sizes having different widths can be mounted on tire bases T with a high degree of accuracy. If necessary, the inside diameter of the supporter 12 (paddle plates 14) is increased until it becomes slightly larger than the outside diameter of the tire base T.

Figure 7:
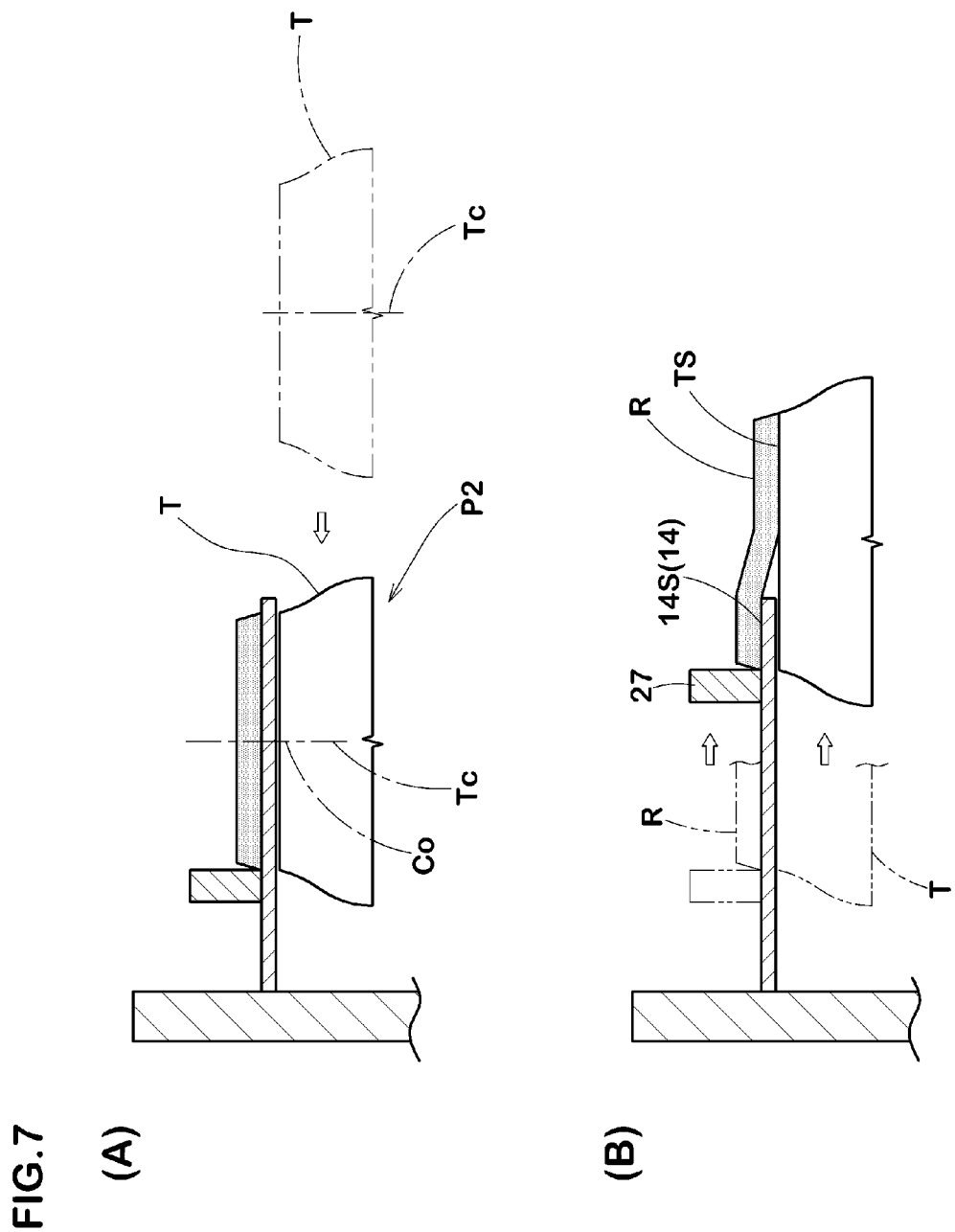
Figure 8:
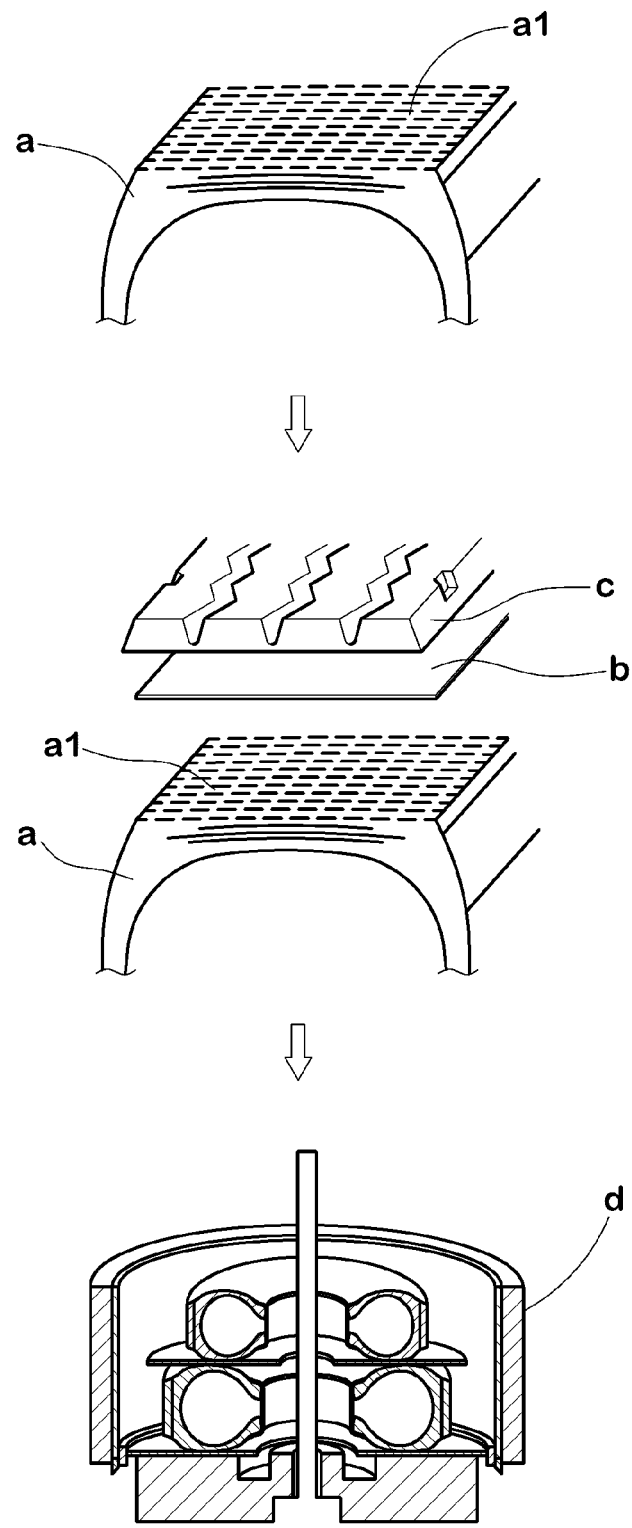

Next, as shown conceptually in FIG. 7 (A), the tire base holding section 2 moves to the second position P2.

At the second position P2, the width center line Tc of the tire base T coincides with the reference position Co of the supporter 12.

Next, as shown conceptually in FIG. 7 (B), the tire base holding section 2 and the push-out plates 27 start to move toward the first position P1 at the same time and at the same speed.

Thereby, the tread ring R can be transferred onto the outer peripheral surface TS of the tire base T during retaining a state in which the centers of the tire base T and the tread ring R are accurately aligned with each other.

Accordingly, the tread ring R is mounted on the tire base T with high accuracy.

Since the push-out plates 27 move on the outer surfaces 14S of the paddle plates 14, the tread ring R is pushed out without being deformed.

According to the present invention, a high quality retreaded tire can be manufactured.

while description has been made of one particularly preferable embodiment of the present invention, the illustrated embodiment should not be construed as to limit the scope of the present invention; various modifications are possible.

DESCRIPTION OF THE REFERENCE SIGNS 1 apparatus for mounting a tread ring on a tire base
2 tire base holding section
3 tread ring mounting section
10 tread holder
11 tread pushing-out device
12 supporter
12S holding surface
13 diameter increasing/decreasing device
14 paddle plate
15 radially-movable carriage
15H threaded hole
16 first gear wheel
17 second gear wheel
18 coupler 19 ball screw axis
25 pusher
26 pusher moving means
27 push-out plate
27H threaded hole
28 abutting surface
32 ball screw axis
P1 first position
P2 second position
R tread ring
T tire base

The invention claimed is:

1. A method for manufacturing a retreaded tire by the use of an apparatus for mounting an annular tread ring made of vulcanized rubber on an outer peripheral surface of a tire base, the apparatus comprising:
   a tire base holding section which holds the tire base and which is movable in an axial direction of the tire base between a first position and a second position, and
   a tread ring mounting section which mounts the tread ring on the outer peripheral surface of the tire base and which is disposed on the second position side of the tire base holding section,
   the tread ring mounting section comprising
      a tread holder for holding the inner circumferential surface of the tread ring, and
      a tread pushing-out device for pushing out the tread ring held by the tread holder in the axial direction,
   the tread holder comprising a plurality of paddle plates arranged on a circle concentric with the tire base and having holding surfaces for holding the inner circumferential surface of the tread ring, and
   the tread pushing-out device comprising
      push-out plates being movable in the axial direction on the holding surfaces of the respective paddle plates and having abutting surfaces capable of abutting a side face of the tread ring on the second position side, and
      a pusher moving means for pushing out the respective push-out plates toward the first position,
said method comprising the steps of:
   holding a tire base by the tire base holding section at the first position,
   holding the tread ring by the paddle plates at the second position,
   moving the tire base held by the tire base holding section to the second position so that the tread ring is placed radially outside the tire base, and
   mounting the tread ring on the outer peripheral surface of the tire base by moving the push-out plates toward the first position so that the tread ring is pushed out from the paddle plates toward the first position, and at the same time, by moving the tire base held by the tire base holding section toward the first position at the same speed as the pushed-out tread ring.

2. The method according to claim 1, wherein the tread holder comprises a diameter increasing/decreasing device for moving the respective paddle plates radially outwardly or inwardly to increase or decrease the diameter of the holding surfaces.

3. The method according to claim 2, wherein
   the paddle plates are attached to respective radially-movable carriages; and
   the diameter increasing/decreasing device comprises
      an electrical motor,
      a central first gear wheel held concentrically with the tire base and driven by the electrical motor,
      a plurality of second gear wheels arranged around the first gear wheel and engaged with the first gear wheel,
      radially extending ball screws coupled with the second gear wheels through couplers, and
      radially-movable carriages having threaded holes screwed with the ball screws and movable radially inwardly or outwardly by rotating the ball screws.

4. The method according to claim 1, wherein the pusher moving means comprises
   second ball screws extending in the axial direction, rotatably supported by respective radially-movable carriages and driven by an electrical motor, and
   threaded holes formed in the push-out plates and screwed with the respective second ball screws,
   whereby the push-out plates are moved in the axial direction by rotating the second ball screws.

* * * * *